United States Patent
Fauth et al.

(10) Patent No.: US 6,933,653 B2
(45) Date of Patent: Aug. 23, 2005

(54) ARMATURE AND METHOD FOR PRODUCING AN ARMATURE

(75) Inventors: Lothar Fauth, Buehl (DE); Klaus-Dieter Haefele, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 12 days.

(21) Appl. No.: 10/432,508

(22) PCT Filed: Nov. 19, 2001

(86) PCT No.: PCT/DE01/04296
§ 371 (c)(1),
(2), (4) Date: Oct. 27, 2003

(87) PCT Pub. No.: WO02/43222
PCT Pub. Date: May 30, 2002

(65) Prior Publication Data
US 2004/0066112 A1 Apr. 8, 2004

(30) Foreign Application Priority Data
Nov. 21, 2000 (DE) .......................... 100 57 633

(51) Int. Cl.⁷ ................................................ H02K 1/22
(52) U.S. Cl. ....................................... 310/261; 310/217
(58) Field of Search ................................ 310/216–218, 310/261–269, 156.01–156.84, 61, 64; 29/598

(56) References Cited

U.S. PATENT DOCUMENTS

| 2,421,115 | A |   | 5/1947 | Carlson ........................ 29/598 |
| 3,650,022 | A | * | 3/1972 | Stone ........................... 29/598 |
| 3,659,129 | A | * | 4/1972 | Pettersen .................... 310/216 |
| 4,326,333 | A | * | 4/1982 | Otto ............................. 29/598 |
| 4,469,970 | A | * | 9/1984 | Neumann ............... 310/156.78 |
| 6,265,802 | B1 | * | 7/2001 | Getschmann ............... 310/216 |
| 6,741,010 | B2 | * | 5/2004 | Wilkin ........................ 310/268 |

FOREIGN PATENT DOCUMENTS

| DE |   | 629 301 | 4/1936 |
| DE |   | 942 528 | 5/1956 |
| DE |   | 121 438 | 7/1976 |
| FR |   | 2342575 A | 9/1977 |
| JP |   | 2000-270505 | 9/2000 |

\* cited by examiner

Primary Examiner—Dang Le
(74) Attorney, Agent, or Firm—Ronald E. Greigg

(57) ABSTRACT

An armature according to the invention is comprised of a number of lamination modules, wherein each module has a beginning region and an end region that are each fastened to the rotor shaft so that even in the presence of very high torques, the holding force for the sheet metal laminations between the beginning region and end region is so great that they do not shift.

7 Claims, 1 Drawing Sheet

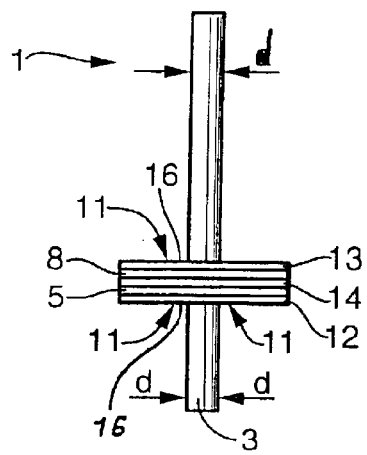 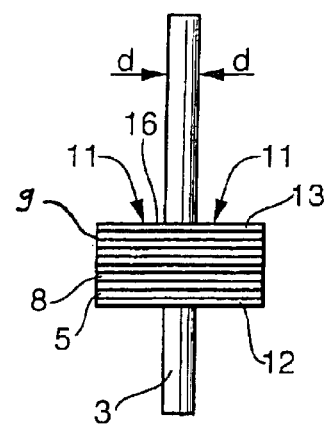 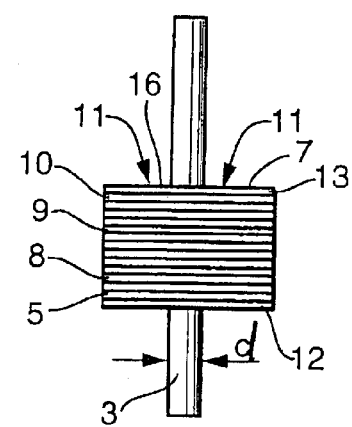
Fig. 1a    Fig. 1b    Fig. 1c
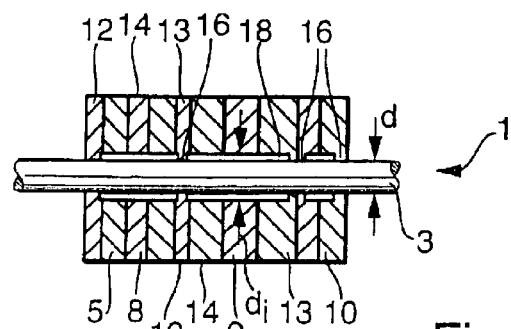
Fig. 2

ARMATURE AND METHOD FOR PRODUCING AN ARMATURE

CROSS-REFERENCE TO RELATED APPLICATIONS

This application is a 35 USC 371 application of PCT/DE 01/04296 filed on Nov. 19, 2001.

BACKGROUND OF THE INVENTION

1. Field of the Invention

The invention is directed to an improved armature and method for producing an armature including a shaft and at least five sheet metal laminations fixed on the shaft.

2. Description of the Prior Art

It is known to affix a lamination bundle, which is comprised of a number of sheet metal laminations, to a rotor shaft by means of pressing them onto the shaft in order to produce an armature for an electric machine. There is both positive and frictional engagement between each sheet metal lamination and the rotor shaft. Particularly with a large number of sheet metal laminations, i.e. a long lamination bundle, it is difficult to fasten this to the rotor shaft in one step without damaging sheet metal laminations and/or the rotor shaft. Frequently, so-called stepped rotor shafts are used, which are complex to produce and are more expensive.

It is also known to fasten a lamination bundle to a rotor shaft by attaching only a beginning region and an end region, which are each comprised of at least one sheet metal lamination, to the rotor shaft by means of caulking. Particularly with long lamination bundles and high torques, there is the possibility of the sheet metal laminations between the beginning region and the end region shifting due to insufficient holding forces in the lamination bundle.

SUMMARY OF THE INVENTION

The armature according to the invention and the method according to the invention for producing an armature have the advantage over the prior art that sheet metal laminations are securely affixed to a rotor shaft in a simple manner.

Advantageous modifications and improvements of the armature and the method for producing an armature are also disclosed.

In order to produce an attachment between the sheet metal lamination and the rotor shaft, it is advantageous to fasten the sheet metal lamination to the rotor shaft by means of a plastic deformation of the sheet metal lamination.

One advantage for the armature is achieved in that the rotor shaft has a continuous outer diameter because such a rotor shaft is easy and inexpensive to produce.

It is advantageous if the sheet metal laminations have approximately the same inner diameter because this reduces the number of types of sheet metal laminations and eliminates confusion among different sheet metal laminations with regard to the sequence in which they are stacked.

BRIEF DESCRIPTION OF THE DRAWINGS

An exemplary embodiment of the invention will be described more fully herein below, with reference to the drawings, in which:

FIGS. 1a, b, and c show how an armature according to the invention is produced, which armature is comprised of a rotor shaft and modules, and FIG. 2 shows an axial cross section through an armature according to the invention.

DESCRIPTION OF THE PREFERRED EMBODIMENT

FIG. 1a shows a rotor shaft 3 and a number of sheet metal laminations 5, which constitute components of an armature 1 according to the invention. An armature 1 of this kind is used for an electric machine, e.g. an electric motor or an electric generator.

A number of sheet metal laminations 5, which comprise a first module 8, are fastened to the rotor shaft 3. Each module has a beginning region 12, a middle region 14, and an end region 13.

The attachment of the laminations to the shaft can be produced in various ways, e.g. by pressing sheet metal laminations 5 with a round bore onto a notched or knurled rotor shaft 3. In this instance, the sheet metal laminations 5 have different inner diameters di. The sheet metal laminations 5 of the beginning region 12 and end region 13 have a smaller inner diameter di than the sheet metal laminations 5 of the middle region 14. The inner diameter di of the sheet metal laminations 5 in the beginning region 12 and end region 13 is designed so that an attachment of the sheet metal laminations 5 to the rotor shaft 3 is produced according to one of the methods mentioned above, exclusively in these regions 12, 13.

The middle region 14 is held by the frictional engagement acting in the axial direction between the beginning region 12 and end region 13.

In another type of attachment, a number of sheet metal laminations 5—all of the sheet metal laminations 5 having the same inner diameter di within the range of tolerance and constituting a module 8—are slid onto the rotor shaft 3, wherein the outer diameter d of the rotor shaft 3 and the inner diameter di of a through bore 18 of the sheet metal laminations 5 are selected so that no attachment is produced at first, i.e. there is a clearance fit. For example, the rotor shaft 3 has a continuous outer diameter d.

The first module 8—which is comprised for example of four sheet metal laminations 5—is then fastened to the rotor shaft 3 at a predetermined location on the rotor shaft 3. This occurs by virtue of the fact that an attachment is produced between at least one sheet metal lamination 5 and the rotor shaft 3, exclusively in the beginning region 12 and end region 13 of the first module 8.

This can once again occur in various ways, for example through plastic deformation of the rotor shaft 3 or plastic deformation of the sheet metal laminations 5 in the beginning region 12 and end region 13 (FIG. 1a), in which material of the respective sheet metal lamination 5 is slid onto the rotor shaft 3 and produces a caulked attachment to the rotor shaft 3, or through the insertion of wedges between the sheet metal lamination 5 and the rotor shaft 3 in the beginning region 12 and end region 13.

The plastic deformation of the rotor shaft 3 or of the beginning region 12 and end region 13 is produced by caulking tools 11, which are indicated by arrows in the drawings.

In the next step (FIG. 1b), a second module 9, which is likewise comprised of a number of sheet metal laminations 5, is slid with play onto the rotor shaft 3 and is brought into contact, for example, with the first module 8.

Then in the end region 13 of the second module 9, an attachment is once again produced between at least one sheet metal lamination 5 and the rotor shaft 3 by means of the caulking tool 11.

This step can also be repeated a number of times, as also shown in FIG. 1c, in which a third module 10 is also disposed on the rotor shaft 3 and is fastened in the end region 13.

The armature 1 according to the invention is made up of a number of modules 8, 9, 10 that comprise a lamination bundle 7 and are each attached separately to the rotor shaft 3. The modules 8, 9, 10 can also be attached to the rotor shaft 3 spaced a certain distance apart from one another.

FIG. 2 shows an axial cross section through an armature 1 according to the invention, according to FIG. 1c.

The armature 1 according to the invention is comprised, for example, of three modules 8, 9, 10. Each module 8, 9, 10 is comprised of the beginning region 12 and the end region 13, between which the middle region 14 is situated. The beginning region 12 is comprised of at least one sheet metal lamination 5, which is fastened to the rotor shaft 3.

The beginning region 12 and end region 13 of the modules 8, 9, 10 are each thus secured to the rotor shaft 3 by means of a fastening region 16—or a caulking region 16 if the attachment is produced through caulking—which beginning region 12 and end region 13 are each comprised of one (FIG. 2) or more sheet metal laminations 5. The middle region 14 is held by the frictional engagement acting in the axial direction between the beginning region 12 and end region 13. The sheet metal laminations 5 of the middle region 14 do not constitute a frictional engagement with the rotor shaft 3 that would be enough to secure the sheet metal laminations 5 to the rotor shaft 3 at high speeds.

The second module 9 likewise has a beginning region 12, a middle region 14, and an end region 13. The end region 13 of the first module 8 can also simultaneously constitute the beginning region 12 of the second module 9, even if this is only comprised of one sheet metal lamination 5.

Thus the end region 13 of the second module 9 simultaneously constitutes the beginning region 12 of the third module 10. Particularly in long lamination bundles, i.e. with a very large number of sheet metal laminations 5, this modular design is advantageous. Even in the presence of very high torques, which act on the sheet metal laminations in the middle region 14, no shifting of the sheet metal laminations 5 occurs in these regions 14.

The number of sheet metal laminations 5 for a module 8, 9, 10, and the position of the modules 8, 9, 10 in relation to one another can be freely selected.

The foregoing relates to preferred exemplary embodiments of the invention, it being understood that other variants and embodiments thereof are possible within the spirit and scope of the invention, the latter being defined by the appended claims.

We claim:

1. An armature for an electric machine, comprising
   a rotor shaft,
   at least three sheet metal laminations (5) constituting a first module which is disposed on the rotor shaft (3),
   the first module having a beginning region (12), a middle region (14), and an end region (13), the three regions being contiguous with only the beginning region (12) and the end region (13) of the first module being fastened to the rotor shaft (3), while the middle region (14) of the first module has play in relation to the rotor shaft (3) on which it is disposed,
   at least one additional module disposed on the rotor shaft, each additional module being composed of at least two sheet metal laminations, wherein each additional module has at least one sheet metal lamination which forms a middle portion and at least one sheet metal lamination which forms an end portion, wherein each of the laminations which forms the middle portion of the at least one additional modules having play in relation to the rotor shaft, and each of the laminations which forms the end portion of the at least one additional modules being fastened to the rotor shaft.

2. The armature according to claim 1, wherein the attachment of the beginning region (12) and the end region (13) is produced through deformation of at least one sheet metal lamination (5).

3. The armature according to claim 2, wherein the sheet metal laminations (5) have approximately the same inner diameter (di).

4. The armature according to claim 1, wherein the sheet metal laminations (5) have approximately the same inner diameter (di).

5. The armature according to claim 1, wherein the rotor shaft (3) has only one outer diameter (d).

6. A method for producing an armature with a rotor shaft and sheet metal laminations disposed on the rotor shaft, the method comprising
   combining at least three sheet metal laminations (5) to form a first module (8) having a beginning region, a middle region, and an end region with said regions being contiguous,
   sliding the first module (8) with play onto the rotor shaft (3),
   fastening the first module (8) to the rotor shaft (3) only at the beginning region (12) and the end region (13),
   forming at least one additional module (9, 10) wherein each additional module is formed from at least two sheet metal laminations and has at least a middle region and an end region, and sliding each of the at least one additional modules onto the rotor shaft (3) with play, and
   separately fastening each of the at least one additional modules (9, 10) to the rotor shaft (3) only in its end region (13).

7. The method for producing an armature according to claim 6, wherein the beginning region (12) and end region (13) are fastened to the rotor shaft (3) through deformation by means of a caulking tool (11).

* * * * *